United States Patent
Weiss et al.

(10) Patent No.: US 10,844,291 B2
(45) Date of Patent: Nov. 24, 2020

(54) METHOD FOR TREATING A HYDROCARBON FEEDSTOCK COMPRISING A DEASPHALTING STEP AND AN ASPHALT CONDITIONING STEP

(71) Applicant: IFP Energies nouvelles, Rueil-Malmaison (FR)

(72) Inventors: Wilfried Weiss, Valencin (FR); Jean-Francois Le Coz, Saint Germain en Laye (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/314,162

(22) PCT Filed: May 30, 2017

(86) PCT No.: PCT/EP2017/063023
§ 371 (c)(1),
(2) Date: Dec. 28, 2018

(87) PCT Pub. No.: WO2018/001669
PCT Pub. Date: Jan. 4, 2018

(65) Prior Publication Data
US 2019/0161687 A1    May 30, 2019

(30) Foreign Application Priority Data
Jun. 30, 2016 (FR) ...................................... 16 56214

(51) Int. Cl.
*C10G 21/14* (2006.01)
*C10C 3/14* (2006.01)
(Continued)

(52) U.S. Cl.
CPC ............... *C10G 21/14* (2013.01); *B01D 1/00* (2013.01); *C10C 3/002* (2013.01); *C10C 3/14* (2013.01);
(Continued)

(58) Field of Classification Search
CPC ...... C10G 21/003; C10G 21/02; C10G 21/14; C10G 21/16; C10G 21/28; C10C 3/002; C10C 3/14
See application file for complete search history.

(56) References Cited

U.S. PATENT DOCUMENTS 3,274,096 A    9/1966  Bushnell et al.
3,847,751 A *  11/1974 Godino ..................... C10C 3/00
                                                         196/155
(Continued)

FOREIGN PATENT DOCUMENTS

FR    1408708 A    8/1965
FR    2598716 B1   10/1988
(Continued)

OTHER PUBLICATIONS

English machine translation of WO 2014/096592, obtained from WIPO website. (Year: 2014).*
(Continued)

*Primary Examiner* — Renee Robinson
(74) *Attorney, Agent, or Firm* — Millen White Zelano and Branigan, PC; John Sopp

(57) ABSTRACT

The invention relates to a process for treating a hydrocarbon-based feedstock, comprising a) a step of extracting the feedstock, b) a step of separating the fraction comprising de-asphalted oil, c) an optional step of injecting a withdrawal flux into the fraction comprising asphalt, d) an optional step of separating the fraction comprising asphalt and solvent or solvent mixture obtained from the extraction
(Continued)

step a), e) an optional step of injecting a withdrawal flux into the asphalt fraction alone or as a mixture with a withdrawal flux obtained from step d) and an integrated step of conditioning the asphalt fraction obtained from steps a) and/or c) and/or d) and/or e), in solid form, performed in successive or simultaneous substeps.

23 Claims, 6 Drawing Sheets

(51) Int. Cl.
    *C10G 53/06* (2006.01)
    *C10G 21/00* (2006.01)
    *B01D 1/00* (2006.01)
    *C10C 3/00* (2006.01)
    *C10G 21/16* (2006.01)
    *C10G 7/06* (2006.01)
    *C10G 21/02* (2006.01)
    *C10G 21/28* (2006.01)
    *C10G 21/30* (2006.01)

(52) U.S. Cl.
    CPC .............. *C10G 7/06* (2013.01); *C10G 21/003* (2013.01); *C10G 21/02* (2013.01); *C10G 21/16* (2013.01); *C10G 53/06* (2013.01); *C10G 21/28* (2013.01); *C10G 21/30* (2013.01); *C10G 2300/104* (2013.01); *C10G 2300/107* (2013.01); *C10G 2300/1077* (2013.01); *C10G 2300/206* (2013.01); *C10G 2300/4012* (2013.01); *C10G 2300/44* (2013.01)

(56) References Cited

U.S. PATENT DOCUMENTS

| 4,810,367 A | 3/1989 | Chombart et al. |
| 9,982,203 B2 | 5/2018 | Majcher et al. |

FOREIGN PATENT DOCUMENTS

| FR | 3014110 B1 | 12/2015 | | |
| WO | WO 2014/096592 | * | 6/2014 | ............. C10G 21/00 |
| WO | 15082314 A1 | | 6/2015 | |

OTHER PUBLICATIONS

International Search Report PCT/EP2017/063023 dated Aug. 3, 2017 (pp. 1-4).

* cited by examiner

METHOD FOR TREATING A HYDROCARBON FEEDSTOCK COMPRISING A DEASPHALTING STEP AND AN ASPHALT CONDITIONING STEP

The present invention relates to the treatment of heavy hydrocarbon fractions containing, inter alia, sulfur-based impurities, metals and asphaltenes. The invention more particularly relates to a process for treating heavy petroleum feedstocks of atmospheric residue and/or vacuum residue type for the production of a major fraction with a reduced content of impurities and of a minor fraction in which the impurities are concentrated.

The process according to the invention may be termed a carbon rejection process of de-asphalting type. The major fraction with a reduced content of impurities may thus be more easily upgraded as such or via another refining process.

In the field of treating heavy hydrocarbon fractions, especially in de-asphalting, one of the problems encountered lies in the operability of the asphalt fraction which proves to be the cause of the fouling and clogging of units. This leads to frequent stopping of the units for cleaning and is detrimental to the efficiency and profitability of such processes.

Asphalt may be characterized by its softening point. A softening point of 160° C. means a viscosity at this temperature of 1 million to 2 million centistokes (cSt) at this temperature. A viscosity of the order of 500 cSt may be deduced therefrom at the outlet temperature of an asphalt stripping unit (or stripper) operated at 280° C. Under such conditions, the evacuation of the asphalt and its flow into an asphalt upgrading step such as fluxing, gasification, solidification, etc. is imperfect (conventional scheme in which asphalt flows by gravity and by pressure difference between the two stripping and solidification steps).

It is also known that the maximum viscosity for pumping the asphalt fraction is of the order of 2000 cSt, but, for operation reliability reasons, about 200 cSt is recommended; since processes are liable to fluctuate in temperature, it is often preferable to operate between 10 to 50° C. above the temperature at which the pumpability limit is reached (2000 cSt).

These posed problems often limit the efficient upgrading of asphalt. The current state of the art does not make it possible to extract asphalts with a softening point of greater than 160° C. in liquid form, under reliability conditions that are satisfactory with respect to the risk of clogging.

One object of the invention is to improve the efficiency of the treatment process by eliminating the individual asphalt stripping step which generally involves equipment that is liable to become fouled. The invention proposes especially to integrate the stripping of asphalt and its solidification in a dynamic conditioning system which blends, stirs or grinds the asphalt during its cooling, by means of a rotating or screw system (rotating interior) so as to be freed of the intermediate viscosity constraint and to avoid clogging.

The Applicant has thus developed a novel de-asphalting process integrating a step of conditioning asphalt in solid form so as to make it readily transportable. The integration of the asphalt conditioning step is particularly advantageous when the de-asphalting conditions lead to the production of an asphalt with a high softening point, for example during de-asphalting using a solvent or a mixture of solvents of similar polarity, or using a mixture of solvents of different polarity.

More precisely, the invention relates to a process for treating a hydrocarbon-based feedstock containing hydrocarbons with a content of C7 asphaltenes of at least 1% by mass, preferably of at least 2% by mass relative to the feedstock, an initial boiling point of at least 340° C., preferably of at least 450° C., and a final boiling point of at least 550° C., preferably of at least 600° C., said process comprising the following steps:

a) a step of extracting the feedstock using a solvent or a solvent mixture making it possible to obtain, on the one hand, at least one fraction comprising asphalt and solvent or solvent mixture, and, on the other hand, at least one fraction comprising de-asphalted oil and solvent or solvent mixture, b) a step of separating the fraction comprising de-asphalted oil and solvent or solvent mixture obtained from the extraction step a), making it possible to separate the de-asphalted oil from the solvent or solvent mixture introduced into the extraction step a), c) an optional step of injecting a withdrawal flux into the fraction comprising asphalt and solvent or solvent mixture obtained from the extraction step a), d) an optional step of separating the fraction comprising asphalt and solvent or solvent mixture obtained from the extraction step a), optionally as a mixture with the withdrawal flux introduced during the optional step c), making it possible to separate an asphalt fraction alone or as a mixture with a flux for withdrawal of the solvent or solvent mixture introduced into the extraction step a), e) an optional step of injecting a withdrawal flux into the asphalt fraction alone or as a mixture with a withdrawal flux obtained from step d), the process being characterized in that step c) and/or e) of injecting the withdrawal flux is (are) present when the softening point of the asphalt is greater than 160° C., and in that said process comprises a step of conditioning the asphalt fraction obtained from steps a) and/or c) and/or d) and/or e), in solid form, performed as successive or simultaneous substeps:

a substep f) during which the asphalt fraction is heated to a temperature of between 120 and 340° C. and above the softening point of the asphalt, a substep g) during which the asphalt separated from the solvent, from the solvent mixture and/or from the flux is cooled to a temperature below the softening point of the asphalt.

Advantageously, according to the invention, the asphalt fraction or asphalt produced via the process as a softening point excluding solvent and excluding flux (measured according to the ring and ball method of standard EN 1427 or the ring and ball method of standard ASTM D36) of greater than 120° C., preferentially greater than 160° C., more preferentially between 120 and 250° C., more preferentially between 160 and 250° C., more preferentially between 120 and 220° C., more preferentially between 160 and 220° C.

Advantageously, according to the invention, substeps f) and g) are performed in at least two subunits or in a single unit equipped with at least one means that is capable of keeping the asphalt fraction in motion or stirring or grinding it continuously, at least one means of heating and cooling and at least means that are capable of removing the solvent, the solvent mixture and/or the flux of the process.

Among the advantages of the present invention, the following may be noted:

the possibility of producing an asphalt in solid form with a very high softening point, the withdrawal of which may be facilitated with a withdrawal flux;

the obtention of de-asphalted oil in high yield with a reduced content of impurities, which may be upgraded as such or in another refining process;

the recovery of at least part of the withdrawal flux, of the solvent or of the solvent mixture, which avoids its loss with the asphalt;

the possibility of eliminating the conventional individual stripping step (step d) which generally involves equipment that is liable to become fouled.

DESCRIPTION OF THE FIGURES

The descriptions below constitute examples of implementation of the invention without limiting its scope. For the sake of simplicity, only the main steps are represented, but it is understood that all the equipment required for functioning is present (vessels, pumps, exchangers, ovens, columns, etc.). Only the main streams are represented.

Figure 1:
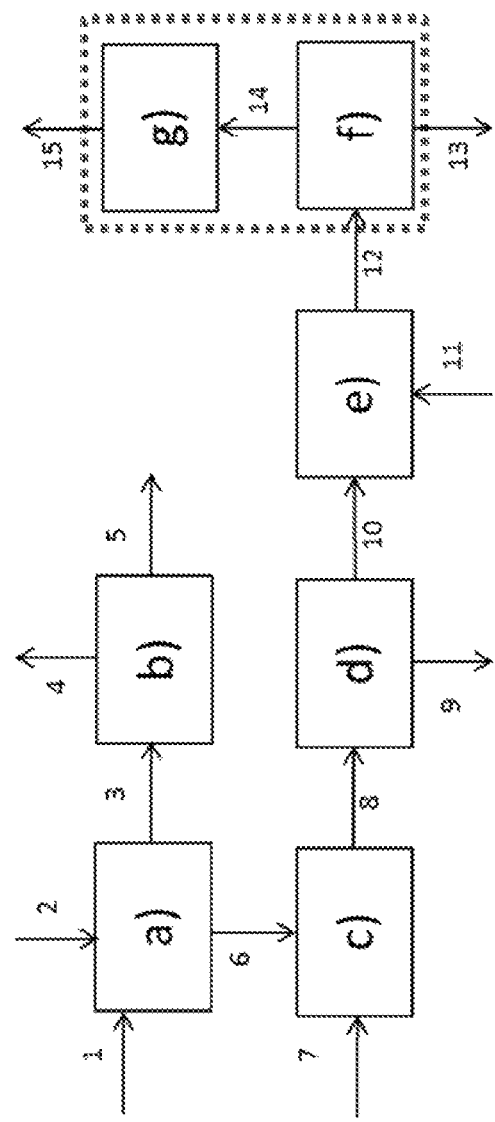
FIG. 1 illustrates a schematic view of the process according to a first implementation of the invention.

The feedstock (1) is introduced as a mixture with a solvent or a solvent mixture (2) into an extraction step a) making it possible to obtain at least one fraction (3) comprising de-asphalted oil and solvent or solvent mixture and a fraction (6) comprising asphalt and solvent or solvent mixture. One part of the solvent or of the solvent mixture is generally introduced as a mixture with the feedstock into a first point of the extractor, while another part may be injected alone into a different point as a stream not shown, this point preferably being lower than the first point, and thus close to the bottom of the same extractor.

A step b) of separating the fraction (3) comprising de-asphalted oil and solvent or solvent mixture obtained from the extraction step a), making it possible to obtain at least one de-asphalted oil (5) and part of the solvent or of the solvent mixture (4) introduced into the extraction step a).

A step c) of injecting withdrawal flux (7) into the fraction (6) comprising asphalt and solvent or solvent mixture obtained from the extraction step a), making it possible to obtain a fraction (8) that is less viscous than the fraction (6).

A step d) of separating the less viscous fraction (8) comprising asphalt, solvent or solvent mixture, and withdrawal flux, obtained from step c), making it possible preferably to separate at least one asphalt fraction (10) from at least part of the solvent or solvent mixture (9) introduced into the extraction step a).

A step e) of injecting withdrawal flux (11) into the fraction (10) obtained from the separation step d), making it possible to obtain a fraction (12) that is less viscous than the fraction (10).

A step of conditioning the asphalt fraction obtained from steps a) and/or c) and/or d) and/or e), in solid form, performed as successive or simultaneous substeps:

a substep f) of separating the fraction (12) obtained from step e) making it possible to recover at least partly the withdrawal flux introduced into the injection steps c) and e), optionally the solvent or solvent mixture, and an asphalt fraction (14), a substep g) of solidifying the asphalt (14) obtained from the separation substep f), making it possible to recover an asphalt fraction conditioned in solid form (15).

Figure 2:
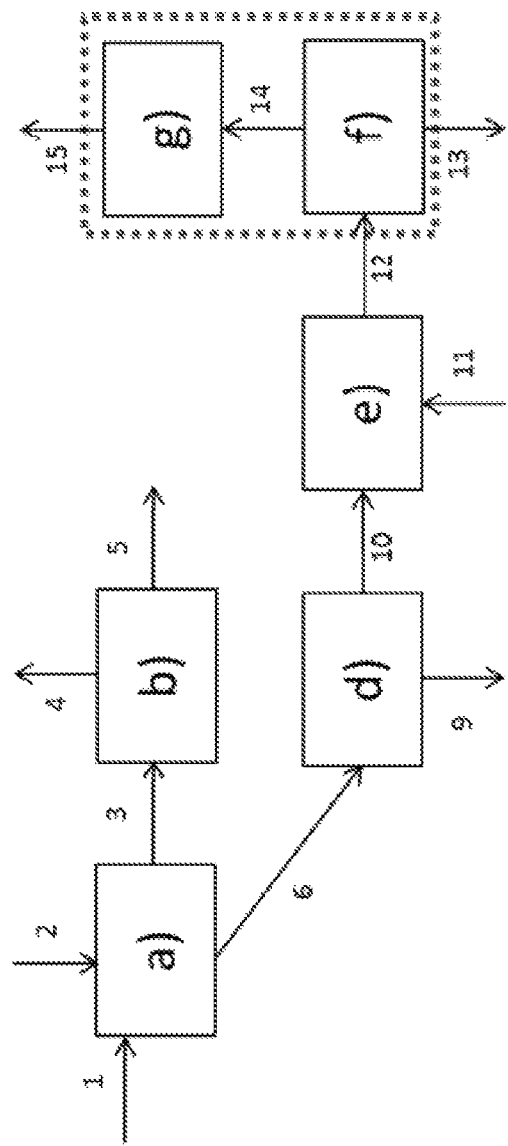

FIG. 2 illustrates a variant of the implementation according to FIG. 1. In this variant, the optional step c) of injecting withdrawal flux is not performed and the fraction (6) comprising asphalt and solvent or solvent mixture is introduced directly into the separation step d). The rest of the implementation is similar to the description of FIG. 1.

Figure 3:
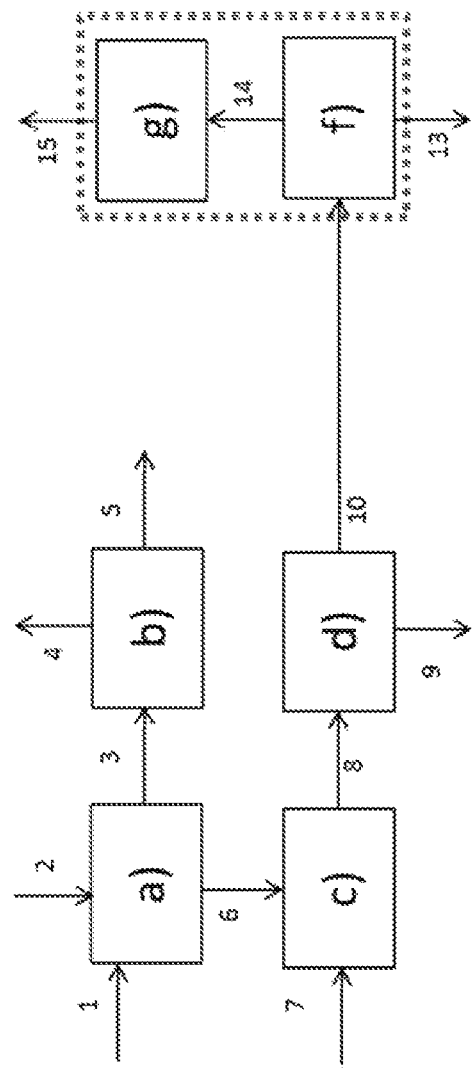

FIG. 3 illustrates a variant of the implementation according to FIG. 1. In this variant, the optional step e) of injecting withdrawal flux is not performed and the fraction (10) comprising asphalt and at least part of the withdrawal flux introduced into step c) is introduced directly into the integrated step of conditioning of the asphalt fraction. The rest of the implementation is similar to the description of FIG. 1.

Figure 4:
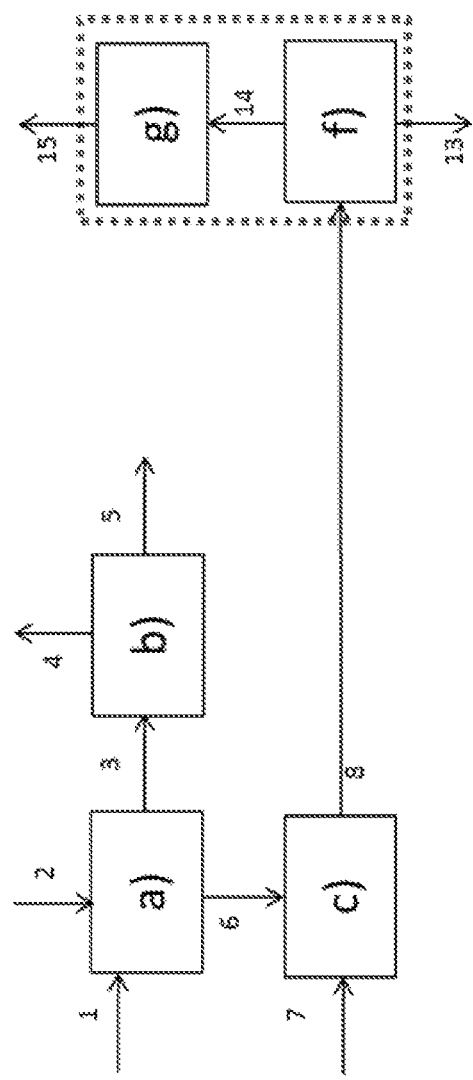

FIG. 4 illustrates a variant of the implementation according to FIG. 1. In this variant, the optional step d) of separating the solvent or solvent mixture is not performed and the fraction (8) comprising asphalt and withdrawal flux introduced into step c) is introduced directly into the integrated step of conditioning of the asphalt fraction during which the solvent or solvent mixture and the withdrawal flux will be removed. The rest of the implementation is similar to the description of FIG. 1.

Figure 5:
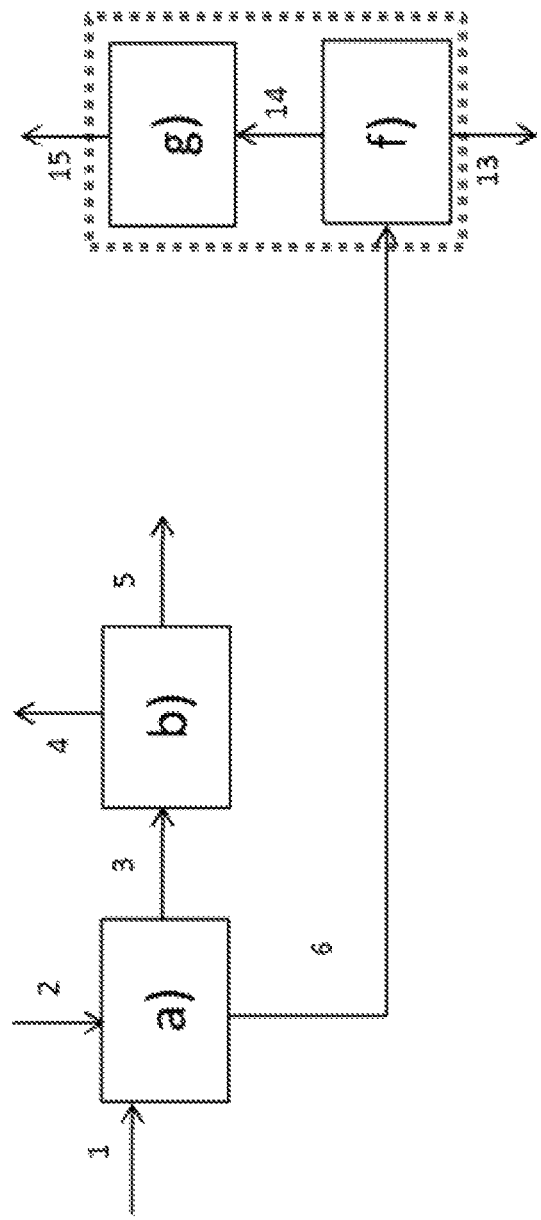

FIG. 5 illustrates a variant of the implementation according to FIG. 1. In this variant, the flux injection steps c) and e) and the separation step d) are not performed. The fraction (6) comprising asphalt and solvent or solvent mixture obtained from step a) is introduced directly into the integrated step of conditioning of the asphalt fraction during which the solvent or the solvent mixture will be removed. The rest of the implementation is similar to the description of FIG. 1.

Figure 6:
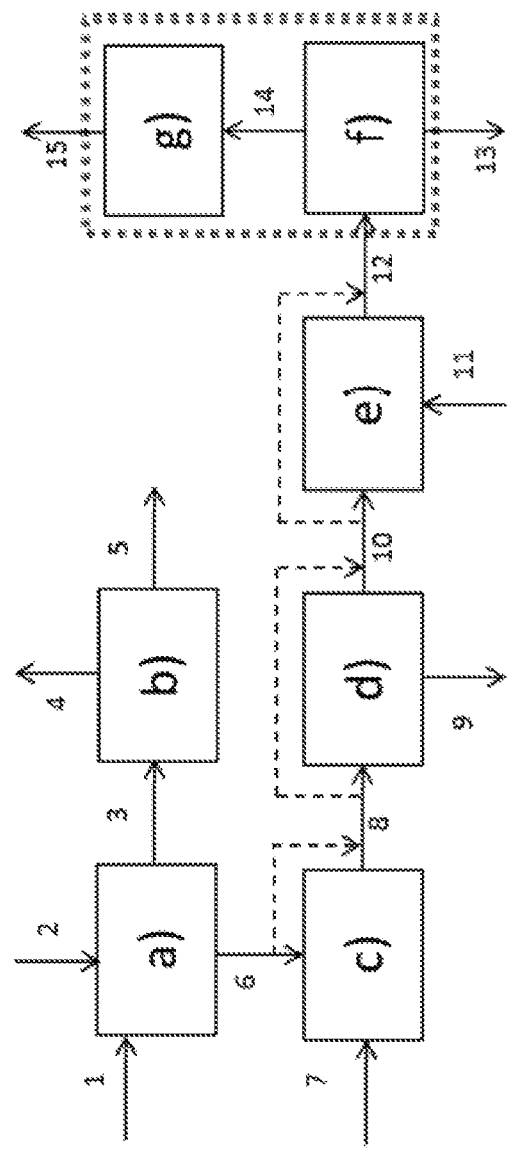

FIG. 6 schematically represents all of the possible variants of the invention with streams in dashed lines representing the possible short-circuiting of each optional step.

It is understood that, in the preceding figures, the solvent (s), the withdrawal flux(es) which may be identical or different, obtained from the separation steps may be at least partly recycled into the process and top-ups may also be performed.

DETAILED DESCRIPTION

The Feedstock

The feedstock treated in the process according to the invention is advantageously a hydrocarbon-based feedstock with a content of C7 asphaltenes of at least 1% by mass, preferably of at least 2% by mass relative to the feedstock, an initial boiling point of at least 340° C., preferably of at least 450° C., and a final boiling point of at least 550° C., preferably of at least 600° C.

The hydrocarbon-based feedstock according to the invention may be chosen from the atmospheric residues and the vacuum residues obtained from direct distillation, crude oils, topped crude oils, bituminous sands or derivatives thereof, bituminous schists or derivatives thereof, and source rock oils or derivatives thereof, taken alone or as a mixture. In the present invention, the feedstocks that are treated are preferably atmospheric residues or vacuum residues, or mixtures of these residues, and more preferentially vacuum residues.

The hydrocarbon-based feedstock treated in the process may contain, inter alia, sulfur-based impurities. The sulfur content may be at least 0.1% by mass, at least 0.5% by mass, preferentially at least 1% by mass and more preferentially at least 2% by mass relative to the feedstock.

The hydrocarbon-based feedstock treated in the process may contain, inter alia, asphaltenes. The content of C7 asphaltenes may be at least 1% by mass, preferably at least 2% by mass relative to the feedstock.

The hydrocarbon-based feedstock treated in the process may contain, inter alia, metals. The content of nickel+vanadium may be at least 10 ppm, preferably at least 30 ppm.

The hydrocarbon-based feedstock treated in the process may contain, inter alia, Conradson carbon. The content of Conradson carbon may be at least 2% by mass, preferably at least 5% by mass relative to the feedstock.

Extraction Step a)

The feedstock according to the invention is subjected to an extraction step a) preferably performed under specific conditions for obtaining a de-asphalted oil preferably in a high yield and an asphalt fraction preferably obtained in smaller amount.

The extraction step a) may be performed in one or more steps, by placing the feedstock in contact with a solvent containing hydrocarbons, so as to obtain an asphalt fraction and a de-asphalted oil fraction known as DAO, step a) advantageously being performed under subcritical conditions for the solvent or solvent mixture used. An apolar solvent or a mixture of polar and apolar solvents may be used. Preferably, a mixture of at least one polar solvent and of at least one apolar solvent is used.

When the extraction step a) is performed using a combination of polar and apolar solvents, this makes it possible to go further in maintaining the dissolution in the oil matrix of all or part of the polar structures of the heavy resins and asphaltenes, which are the main constituents of the asphalt phase. This is then referred to as selective de-asphalting as performed in patent FR 2 999 597B, which is incorporated by reference. Selective de-asphalting thus makes it possible to choose which types of polar structures remain dissolved in the de-asphalted oil matrix. Consequently, it makes it possible to selectively extract from the feedstock only a part of this asphalt, i.e. the structures that are the most polar and the least amenable to hydrotreatment and hydrocracking.

Step a) may be performed in an extraction column or extractor, or in a mixer-decanter. Step a) is preferably performed in an extraction column containing liquid-liquid contactors (packing elements and/or plates, etc.) placed in one or more zones. Preferably, the solvent or the solvent mixture according to the invention is introduced into the extraction column at two different levels. Preferably, the feedstock according to the invention is introduced into an extraction column at only one introduction level, generally as a mixture with at least part of the solvent and generally below a first zone of liquid-liquid contactors. Preferably, the other part of the solvent or solvent mixture is injected lower than the feedstock, generally below a second zone of liquid-liquid contactors, the feedstock being injected above this second zone of contactors.

Step a) is performed under subcritical conditions for said solvent or solvent mixture. Step a) is performed at an extraction temperature advantageously of between 50 and 350° C., preferably between 80 and 320° C., more preferably between 120 and 310° C. and even more preferably between 150 and 300° C., and at a pressure advantageously between 0.1 and 6 MPa, preferably between 1 and 6 MPa and more preferably between 2 and 5 MPa.

The ratio of the volume of solvent or solvent mixture according to the invention (volume of polar solvent+volume of apolar solvent) to the mass of liquid hydrocarbon-based fraction obtained from step a) is generally between 1/1 and 10/1, preferably between 2/1 and 8/1 expressed in litres per kilogram. This ratio includes all of the solvent or solvent mixture that may be divided into several injection points.

The polar solvent used may be chosen from pure aromatic or naphtheno-aromatic solvents, polar solvents including hetero-elements, or a mixture thereof. The aromatic solvent is advantageously chosen from monoaromatic hydrocarbons, preferably benzene, toluene or xylenes, alone or as a mixture; diaromatic or polyaromatic hydrocarbons; naphtheno-aromatic hydrocarbons such as tetralin or indane; heteroaromatic (oxygen-based, nitrogen-based or sulfur-based) aromatic hydrocarbons or any other family of compounds having a more polar nature than saturated hydrocarbons, for instance dimethyl sulfoxide (DMSO), dimethylformamide (DMF) or tetrahydrofuran (THF). The polar solvent used in the process according to the invention may be an aromatic-rich fraction. The aromatic-rich fractions according to the invention may be, for example, fractions obtained from FCC (fluid catalytic cracking) such as heavy gasoline or LCO (light cycle oil) or obtained from petrochemistry units or from refineries. Mention is also made of fractions derived from coal, from biomass or from a biomass/coal mixture optionally with a residual petroleum feedstock after thermochemical conversion with or without hydrogen, and with or without catalyst. Preferably, the polar solvent used is a monoaromatic hydrocarbon which is pure or mixed with an aromatic hydrocarbon.

According to an extraction variant using a combination of polar and apolar solvents, a mixture of polar and apolar solvents is injected into one point, while a solvent or a mixture of polar and apolar solvents is injected into a second point. According to this variant, preferably, a polar solvent heavier than the apolar solvent is injected into the lowest point.

The apolar solvent used is preferably as solvent composed of saturated hydrocarbon comprising a carbon number greater than or equal to 3, preferably between 3 and 9. These solvents are used pure or as a mixture (for example: mixture of alkanes and/or of cycloalkanes or else of light petroleum fractions of naphtha type). Preferably, the apolar solvent contains hydrocarbons with a carbon number of greater than or equal to 4 and less than or equal to 7; very preferably, the apolar solvent contains hydrocarbons with a carbon number of greater than or equal to 5 and less than or equal to 7, so as to obtain an asphalt with a high softening point suitable for the invention and to obtain the de-asphalted oil in high yield.

Advantageously, the volume ratio (v/v) of the apolar solvent to the polar solvent is greater than 50/50, preferably greater than 60/40 and very preferably greater than 70/30.

Advantageously, the boiling point of the polar solvent of the solvent mixture according to the invention is higher than the boiling point of the apolar solvent.

The choice of the temperature and pressure conditions for the extraction combined with the choice of the nature of the solvents and the choice of the optional combination of apolar and polar solvents in the extraction (or de-asphalting) step a) makes it possible to adjust the extraction performance. Step a) makes it possible, by means of specific de-asphalting conditions, to go further in maintaining the dissolution in the oil matrix of all or part of the polar structures of the heavy resins and asphaltenes, which are the main constituents of the asphalt phase in the case of conventional de-asphalting. This results in an improved yield of de-asphalted oil.

A fraction which comprises de-asphalted oil (de-asphalted oil known as DAO) and part of the solvent or solvent mixture according to the invention is recovered at the top of the extraction column or of the mixer-decanter, preferably above the highest-positioned liquid-liquid contactor zone.

A fraction which comprises asphalt and part of the solvent or solvent mixture according to the invention is recovered at the bottom of the extraction column or of the mixer-decanter, preferably below the lowest-positioned contactor zone.

The solvent or solvent mixture is constituted of a top-up and/or of a part recycled during steps b), d) and/or substep f). These top-ups are necessary to compensate for the losses of solvent in the asphalt fraction and/or the de-asphalted oil fraction. These losses are small but cannot be avoided since the separation steps are imperfect by definition.

Step b) of Separation of the Fraction Comprising De-Asphalted Oil

The fraction comprising de-asphalted oil obtained from the extraction step a) is subjected to a separation step b), making it possible to obtain at least one de-asphalted oil and part of the solvent or solvent mixture introduced into the extraction step a). The solvent or solvent mixture recovered may be recycled upstream of the extraction column.

This separation step for purifying and separating the de-asphalted oil and the solvent may involve all the necessary equipment known to those skilled in the art (separating vessels, distillation or stripping columns, heat exchangers, ovens, pumps, compressors, etc.). An inert gas may be used for the stripping.

The de-asphalted oil contains impurity contents less than those of the feedstock. The yield of de-asphalted oil is high, at least 50% by mass of the starting feedstock, preferably greater than 70% by mass of the starting feedstock.

The de-asphalted oil may advantageously be upgraded in another refining process.

Optional Step c) of Injecting Flux

Optionally, a withdrawal flux may be injected as a mixture with the fraction comprising asphalt obtained from step a). Preferably, the flux is injected into at least one point in the bottom of the extraction column used in step a), this or these injection points being located below the lowest point of injection of solvent or solvent mixture introduced into the extraction column used in step a), preferably below the lowest liquid-liquid contactor zone but above the bottom flange of the extraction column used in step a), i.e. at the outlet of the fraction comprising the asphalt.

The use of withdrawal flux facilitates the removal of the asphalt-rich fraction by reducing the viscosity and limits the fouling of the downstream lines and equipment. Step c) and/or e) of injecting withdrawal flux is advantageous when the softening point of the asphalt is greater than 160° C.

The flux is generally a fraction containing hydrocarbons, preferably aromatic hydrocarbons. This flux may advantageously be chosen from monoaromatic compounds (benzene, toluene, xylenes), gasoline fractions preferably obtained from catalytic reforming or from a thermal process such as catalytic cracking, gas oil fractions preferably obtained from a conversion process in the absence of hydrogen, for example a fraction of LCO type obtained from a catalytic cracking process, or aromatic extracts such as those obtained from lubrication oil production lines. Preferably, the flux is a heavy gasoline obtained from catalytic cracking, the final boiling point of which is not more than 250° C.; more preferably, the boiling range of the flux is between 150 and 220° C.

The withdrawal flux may be constituted of a top-up and of a part recycled during step d) or substep f). This top-up is necessary to compensate for the possible losses, which are small but cannot be avoided since the separation steps are imperfect by definition.

On conclusion of step c), a fraction is obtained comprising asphalt and solvent or solvent mixture introduced during step a).

Optional Step d) of Separation of the Fraction Comprising Asphalt

The fraction comprising asphalt obtained from the extraction step a) or obtained from the flux injection step c) may be subjected to an optional separation step d) for separating an asphalt fraction alone or mixed with a flux for withdrawing the solvent or solvent mixture introduced during the extraction step a). The solvent or solvent mixture recovered may be recycled upstream of the extraction column in step a).

This separation step for purifying and separating the asphalt fraction from the solvent or solvent mixture may involve all the necessary equipment (separating vessels, distillation or stripping columns, heat exchangers, ovens, pumps, compressors, etc.). Advantageously, an inert gas is injected into the bottom of the stripping column.

On conclusion of step d), an asphalt fraction is obtained optionally comprising flux if the optional flux injection step c) was performed. In one variant, step d) may make it possible to separate out at least part of the flux, when a flux is injected into step c).

Optional Step e) of Injecting Flux

Optionally, a withdrawal flux may be injected as a mixture with the asphalt fraction obtained from step d) optionally comprising flux if the optional flux injection step c) was performed. Preferably, the flux is injected into at least one point in the bottom of the stripping column used in step d) when it is performed.

The use of withdrawal flux facilitates the removal of the asphalt-rich fraction by reducing the viscosity and limits the fouling of the downstream lines and equipment. Step c) and/or e) of injecting withdrawal flux is advantageous when the softening point of the asphalt is greater than 160° C.

This flux is generally a fraction containing hydrocarbons, preferably aromatic hydrocarbons, preferably of the same nature as the flux defined in the flux injection step c). The optional withdrawal flux may be constituted of a top-up and of a part recycled during step d) or substep f). This top-up is necessary to compensate for the possible losses, which are small but cannot be avoided since the separation steps are imperfect by definition.

On conclusion of step e), an asphalt fraction comprising flux is obtained.

Integrated Step of Conditioning of the Asphalt Fraction Comprising Substeps f) and g)

Substep f)

The process of the present invention comprises an integrated step of conditioning the asphalt fraction obtained from steps a) and/or c) and/or d) and/or e), in solid form, performed as successive or simultaneous substeps:
  a substep f) during which the asphalt fraction is heated to a temperature of between 120 and 340° C. and above the softening point of the asphalt,
  a substep g) during which the asphalt separated from the solvent, from the solvent mixture and/or from the flux is cooled to a temperature below the softening point of the asphalt.

Substep f) makes it possible to recover the solvent or solvent mixture obtained from the extraction step a) in the absence of step d) (or when the separation of the solvent or solvent mixture in d) is incomplete) and optionally the withdrawal flux when said flux is used in step c) and/or step e) of injecting withdrawal flux. This substep f) also makes it possible to recover an asphalt fraction separated from the solvent, from the solvent mixture and/or from the flux.

According to a preferred mode, this separation substep f) is performed for asphalt fractions with a softening point excluding solvent and excluding flux of greater than 120° C., preferentially greater than 160° C., more preferentially between 120 and 250° C., more preferentially between 160 and 250° C., more preferentially between 120 and 220° C., more preferentially between 160 and 220° C.

The separation substep f) is performed at a temperature between 120 and less than or equal to the cracking temperature of the hydrocarbons, which is estimated at 340° C. (temperature generally accepted in vacuum distillations and not leading to excessive cracking). The separation substep f) is preferably performed at a temperature above the boiling point of the solvent, of the solvent mixture and/or optionally of the flux.

The separation substep f) is preferably performed at a low pressure of between 0.1 and 2 MPa and preferably between 0.1 and 1 MPa. Substep f) may be performed by stripping. Substep f) may also be performed under vacuum or under the regime of an individual pressure operation followed by an individual vacuum operation. When the removal of at least part of the solvent, of the solvent mixture and/or optionally of the flux is performed by stripping during the substep f), the pressure is preferably below the vapour pressure of the solvent, of the solvent mixture and/or of the flux that it is desired to remove.

This separation substep for purifying and separating the asphalt and the solvent or solvent mixture and/or the flux may involve all the necessary equipment (separating vessels, distillation or stripping columns, heat exchangers, ovens, pumps, compressors, etc.). The solvent or the solvent mixture and/or the flux may thus be vaporized, distilled or stripped. Advantageously, an inert gas may be injected to facilitate the stripping.

During the removal of the solvent or of the solvent mixture and/or of the flux, the asphalt fraction becomes increasingly viscous. It then becomes particularly pertinent for substep f) to be performed in a subunit or a unit comprising the use of equipment for maintaining in motion or for mechanically stirring or blending or kneading the fraction comprising the asphalt throughout substep f) and gradually as the solvent, the solvent mixture and/or the flux is removed, so as to avoid clogging of the equipment.

To reach the desired temperature, the fraction comprising asphalt obtained from step e) may be heated on entering or in the course of substep f), the ideal preferably being that the equipment for keeping the asphalt fraction in motion during the removal of the solvent, of the solvent mixture and/or of the flux is equipped with a heating system. This equipment must also allow in places the removal of the solvent, of the solvent mixture and/or of the flux stripped out and/or vaporized, for example by means of one or more vents, preferably located at the top of the equipment used. The solvent, the solvent mixture and/or the flux thus recovered may be condensed and at least partly recycled into the extraction steps a), or the flux injection steps c) and/or e).

Among the equipment that may be used, substep f) may comprise, for example, equipment used in the manufacture of polymers, such as devolatilization equipment, blenders, extruding reactors, extruders, extruding blenders, kneaders, kneader reactors, mixers, mixing reactors and mixing kneaders. Preferably, substep f) may comprise as main equipment a kneader reactor, preferably equipped with a heating system.

Substep f) includes a mechanical device, for example a pump optionally completed with a valve system for evacuating the asphalt into substep g) of the integrated conditioning step.

Substep g)

The asphalt fraction obtained from substep f) is subjected to a substep g) directed towards obtaining the asphalt in solid form, to make it more readily transportable and upgradable.

It is understood that when substeps f) and g) may be performed successively, the asphalt separated from the solvent, from the solvent mixture and/or from the flux introduced into substep g) is obtained from substep f).

It is understood that substeps f) and g) may be performed simultaneously in the case where the operating conditions lead to entrainment of the solvent optionally with the aid of an inert stripping gas, and when said conditions are sufficient to bring about simultaneous cooling of the asphalt.

According to a preferred mode, this substep g) is performed for asphalt fractions with a softening point excluding solvent and excluding flux (measured according to the ring and ball method of standard EN 1427 or the ring and ball method of standard ASTM D36) of greater than 120° C., preferentially greater than 160° C., more preferentially between 120 and 250° C., more preferentially between 160 and 250° C., more preferentially between 120 and 220° C., more preferentially between 160 and 220° C.

Substep g) is performed at a temperature below the softening point of the asphalt, preferably at least 25° C. below the softening point, preferably at least 50° C. below the softening point, more preferably at least 100° C. below the softening point. For the majority of asphalts, which have, for example, a softening point of between 120 and 250° C., the greater the difference between the cooling temperature and the softening point, the easier the solidification of the asphalt. In the case where the softening point of the asphalt is very high, for example above 200° C., the temperature of substep g) will advantageously be below 200° C., preferably below 175° C., preferably below 150° C., more preferably below 100° C.

Substep g) is preferably performed at a low pressure of between 0.1 and 2 MPa and preferably between 0.1 and 1 MPa. Substep g) may also be performed at negative pressure, preferably under a slight negative pressure, so as to remove any asphalt dusts into a dust removal system. Substep g) may also include an individual pressure operation followed by an individual negative pressure operation.

During substep g), the asphalt fraction cools, becomes more viscous and may then change state and be in solid form. It then becomes particularly pertinent for substep g) to be performed in a subunit or a unit comprising the use of equipment for maintaining in motion or for mechanically stirring or blending or kneading or for grinding the asphalt fraction throughout substep g) and gradually as cooling takes place, so as to obtain asphalt in divided solid form and to avoid clogging of the equipment.

This conditioning substep may use all the necessary equipment (vessels, heat exchangers, ovens, pumps, valves, etc.). Among the equipment that may be used, substep g) may comprise, for example, blenders, grinders extruding reactors, extruders, extruding blenders, kneaders, kneader reactors, mixers, mixing reactors and mixing kneaders.

Preferably, substep g) comprises as main equipment a kneader reactor, preferably equipped with a cooling system.

Substep g) may include a mechanical device, for example a vibrating tube optionally completed with means for evacuating the asphalt in solid form towards storage.

The equipment of substeps f) and g) may be the same so as to ensure continuity between the two subunits.

The solid asphalt obtained from substep g) may be in the form of asphalt pieces (ground or extruded matter or powder), the largest dimension of which does not exceed 10 cm, preferably 5 cm and more preferably 1 cm. The divided solid state of the asphalt obtained in substep g) is an important criterion which enables this asphalt fraction to be readily transportable and upgradable, unlike liquid asphalts which need to be constantly heated in order to be transported or fluxed asphalts which require a large amount of fluxes.

The solid asphalt obtained from the process according to the invention may, for example, be upgraded as fuel for the production of cements, electricity or steam, or alternatively may be gasified to produce a synthesis gas or hydrogen.

EXAMPLES

The examples that follow are performed with a vacuum residue feedstock A of Arabian Heavy origin. The percentages are expressed on a mass (m) basis, unless otherwise indicated.

TABLE 1

| Characteristics of the feedstock A | |
| --- | --- |
| Density 15/4 | 1.026 |
| Sulfur (% m/m) | 5.4 |
| Conradson carbon (% m/m) | 22 |
| C7 Asphaltenes (% m/m) (standard NF T60-115) | 12 |
| Ni + V (ppm) | 202 |
| Fraction 540° C.+ (% m/m) | 82 |

Example 1

In the first example, conventional de-asphalting is performed, i.e. extraction of the feedstock A with n-pentane as solvent under the operating conditions presented in table 2 (step a).

TABLE 2

| Operating conditions for conventional de-asphalting on feedstock A | |
| --- | --- |
| Solvent | nC5 |
| Solvent/feedstock ratio (v/m) | 6/1 |
| Pressure (MPa) | 4.76 |
| Temperature (° C.) | 180 |

On conclusion of the extraction step, a fraction containing de-asphalted oil and n-pentane is obtained. This fraction is subjected to a separation step so as to separate the pentane and the de-asphalted oil (DAO), the characteristics of which are presented in Table 3.

TABLE 3

| Yields and characteristics of the de-asphalted oil DAO obtained | |
| --- | --- |
| DAO yield (% m/m of the feedstock) | 65 |
| Density 15/4 | 0.985 |
| Sulfur (% m/m) | 4.3 |
| Conradson carbon (%) | 10 |
| Ni + V (ppm) | 36 |
| AC7 | <0.05 |

On conclusion of the extraction step, a fraction containing asphalt and n-pentane is also obtained.

In a first variant, this fraction is subjected to a separation step so as to separate the n-pentane and the asphalt (step d). An asphalt is obtained in a yield of 35% by mass relative to the feedstock. In a second variant, the separation step d) is not performed.

In both cases, the asphalt or the asphalt fraction not separated is subjected to a conditioning step according to the invention.

According to the second variant, the asphalt fraction is subjected to a conditioning step allowing a temperature of 50° C. and a pressure of 0.3 MPa making it possible to separate out the n-pentane (substep f)) and to solidify the asphalt (substep g)) while at the same time continuously grinding the asphalt so as to obtain it in divided solid form. The softening point of the asphalt is 150° C., measured according to standard ASTM D36. The machine used is the Ring and Ball Tester RB36 5G® sold by the company ISL.

Example 2

In the second example, selective de-asphalting is performed, i.e. extraction of the feedstock A with a heptane/toluene mixture as solvent under the operating conditions presented in table 4.

TABLE 4

| Operating conditions for selective de-asphalting on feedstock A | |
| --- | --- |
| Heptane/toluene solvent ratio (v/v) | 90/10 |
| Solvent(s)/feedstock ratio (v/m) | 6/1 |
| Pressure (MPa) | 4.17 |
| Temperature (° C.) | 240 |

On conclusion of the extraction step, a fraction containing de-asphalted oil and heptane/toluene solvent mixture is obtained. This fraction is subjected to a separation step so as to separate the heptane/toluene solvent mixture and the de-asphalted oil (DAO), the characteristics of which are presented in Table 5.

TABLE 5

| Yields and characteristics of the de-asphalted oil DAO obtained | |
| --- | --- |
| DAO yield (% m/m) | 90 |
| Density 15/4 | 1.02 |
| Sulfur (% m/m) | 5.05 |
| Conradson carbon (% m/m) | 18 |
| Ni + V (ppm) | 120 |
| AC7 (% m/m) | 7.0 |

On conclusion of the extraction step, a fraction containing asphalt and heptane/toluene solvent mixture is also obtained. The withdrawal of this fraction is facilitated by injecting a withdrawal flux: in this instance a heavy gasoline originating from a catalytic cracking unit (step c). The flux/asphalt mass ratio is equal to 1.

The fraction containing the asphalt, the heptane/toluene solvent mixture and the withdrawal flux is subjected to a separation step so as to separate the heptane/toluene solvent mixture and the withdrawal flux from the asphalt (step d). The asphalt is obtained in a yield of 10% by mass relative to the feedstock.

The asphalt obtained is subjected to a conditioning step at a temperature of 90° C. and at a pressure of 0.3 MPa, making it possible to separate out the residual traces of solvents and of fluxes especially by stripping (substep f)) and to solidify the asphalt (substep g)) while at the same time continuously grinding the asphalt so as to obtain it in divided solid form. The softening point of the asphalt is 220° C., measured according to the method of standard ASTM D36. The machine used is the Ring and Ball Tester RB36 5G® sold by the company ISL.

The invention claimed is:

1. Process for treating a hydrocarbon-based feedstock containing hydrocarbons with a content of C7 asphaltenes of at least 1% by mass relative to the feedstock, the feedstock having an initial boiling point of at least 340° C., and a final boiling point of at least 600° C., said process comprising the following steps:
   a) a step of extracting the feedstock using a solvent or a solvent mixture to obtain, on the one hand, at least one fraction comprising asphalt and solvent or solvent mixture, and, on the other hand, at least one fraction comprising de-asphalted oil and solvent or solvent mixture,
   b) a step of separating the fraction comprising de-asphalted oil and solvent or solvent mixture obtained from the extraction step a), to separate the de-asphalted oil from the solvent or solvent mixture introduced into the extraction step a),
   c) an optional step of injecting a withdrawal flux into the fraction comprising asphalt and solvent or solvent mixture obtained from the extraction step a),
   d) an optional step of separating the fraction comprising asphalt and solvent or solvent mixture obtained from the extraction step a), optionally as a mixture with the withdrawal flux introduced during the optional step c), and separating an asphalt fraction alone or as a mixture with the withdrawal flux or the solvent or solvent mixture introduced into the extraction step a),
   e) an optional step of injecting a withdrawal flux into the asphalt fraction alone or as a mixture with a withdrawal flux obtained from step d),
   wherein
      at least one of step c) and/or e) of injecting the withdrawal flux is conducted when the softening point of the asphalt is greater than 160° C.,
   wherein:
      the process further comprises a step of conditioning the asphalt fraction obtained from steps a) and/or c) and/or d) and/or e), into solid form, said conditioning being performed as successive or simultaneous substeps f) and g) in at least two subunits or in a single unit, where the unit or at least one subunit is equipped with: at least one means for keeping the asphalt fraction stirred or ground continuously; at least one means of heating and cooling; at least means for separating the asphalt from the solvent, the solvent mixture and/or the withdrawal flux; and at least one means for removing the solvent, the solvent mixture and/or the withdrawal flux; substeps f) and g) comprising:
         a substep f) during which the asphalt fraction is heated to a temperature of between 120 and 340° C. and above the softening point of the asphalt with the asphalt having a softening point, excluding solvent and excluding flux, of between 120 and 250° C.,
         a substep g) during which the asphalt separated from the solvent, from the solvent mixture and/or from the flux during the conditioning is cooled to a temperature below the softening point of the asphalt and the asphalt is obtained in solid form.

2. Process according to claim 1, in which the hydrocarbon-based feedstock is chosen from atmospheric residues, vacuum residues obtained from direct distillation, crude oils, topped crude oils, bituminous sands or derivatives thereof, bituminous schists or derivatives thereof, and source rock oils or derivatives thereof, taken alone or as a mixture.

3. Process according to claim 1, in which step a) is performed under subcritical conditions for said solvent or solvent mixture.

4. Process according to claim 3, in which step a) is performed at an extraction temperature of between 50 and 350° C., and at a pressure of between 0.1 and 6 MPa.

5. Process according to claim 1, in which the solvent or solvent mixture comprises a polar solvent chosen from pure aromatic or naphtheno-aromatic solvents, polar solvents including hetero-elements, or a mixture thereof.

6. Process according to claim 1, in which the solvent or solvent mixture comprises an apolar solvent composed of saturated hydrocarbon comprising a carbon number greater than or equal to 3.

7. Process according to claim 6, in which, removal of at least part of the solvent, of the solvent mixture and/or optionally of the flux is performed by stripping during the substep f), the stripping being conducted at a pressure below the vapour pressure of the solvent, of the solvent mixture and/or of the flux that is removed.

8. Process according to claim 1, in which the withdrawal flux is injected in steps c) and/or e) and the withdrawal flux is chosen from monoaromatic compounds, gasoline fractions obtained from catalytic reforming or from catalytic cracking, gas oil fractions obtained from a conversion process in the absence of hydrogen, or aromatic extracts obtained from lubrication oil production lines.

9. Process according to claim 1, in which, when the extraction step a) uses a combination of polar and apolar solvents, a mixture of polar and apolar solvents is injected into one point, while a solvent or a mixture of polar and apolar solvents is injected into a second point.

10. Process according to claim 1, in which the substep f) includes a step of separating the asphalt from the solvent, the solvent mixture and/or the withdrawal flux and the separating is performed at a temperature above the boiling point of the solvent, of the solvent mixture and/or optionally of the flux and at a pressure of between 0.1 and 2 MPa or under vacuum, or alternatively under the regime of an individual pressure operation followed by an individual vacuum operation.

11. Process according to claim 1, in which substep f) includes a mechanical device for evacuating the asphalt into substep g) of the conditioning step.

12. Process according to claim 1, in which substep g) is performed at a temperature at least 25° C. below the softening point, and at a pressure of between 0.1 and 2 MPa or under negative pressure, or alternatively under the regime of an individual pressure operation followed by an individual negative pressure operation.

13. Process according to claim 1, in which the solvent or solvent mixture comprises an apolar solvent composed of saturated hydrocarbon comprising a carbon number between 3 and 9.

14. Process according to claim 1, in which the solvent or solvent mixture comprises an apolar solvent comprising hydrocarbons with a carbon number of greater than or equal to 4 and less than or equal to 7.

15. Process according to claim 1, in which the solvent or solvent mixture comprises an apolar solvent comprising hydrocarbons with a carbon number of greater than or equal to 5 and less than or equal to 7.

16. Process according to claim 1, in which the unit or subunits for substep f) of the conditioning step comprise equipment used in the manufacture of polymers selected from devolatilization equipment, blenders, extruding reactors, extruders, extruding blenders, kneaders, kneader reactors, mixers, mixing reactors and mixing kneaders.

17. Process according to claim 1, in which the unit or subunits for substep f) of the conditioning step comprise a kneader reactor equipped with a heating system.

18. Process according to claim 1, in which the unit or subunits for substep g) of the conditioning step comprise equipment for mechanically stirring or grinding continuously the asphalt fraction throughout substep g) and as cooling takes place, so as to obtain asphalt in divided solid form and to avoid clogging of the equipment.

19. Process according to claim 1, in which the unit or subunits for substep g) of the conditioning step comprise a kneader reactor equipped with a cooling system.

20. Process according to claim 1, in which the unit or subunits for substep g) of the conditioning step comprise a vibrating tube with means for evacuating the asphalt in solid form towards storage.

21. Process according to claim 1, in which the solid asphalt obtained from substep g) is in the form of asphalt pieces, the largest dimension of which does not exceed 10 cm.

22. Process according to claim 1, in which the solid asphalt obtained from substep g) is in the form of asphalt pieces, the largest dimension of which does not exceed 5 cm.

23. Process according to claim 1, in which the solid asphalt obtained from substep g) is in the form of asphalt pieces, the largest dimension of which does not exceed 1 cm.

* * * * *